(12) United States Patent
Konecky et al.

(10) Patent No.: US 10,621,718 B2
(45) Date of Patent: Apr. 14, 2020

(54) AIDED IMAGE RECONSTRUCTION

(71) Applicant: KLA-Tencor Corporation, Milpitas, CA (US)

(72) Inventors: Soren Konecky, Alameda, CA (US); Robert Danen, Pleasanton, CA (US)

(73) Assignee: KLA-Tencor Corp., Milpitas, CA (US)

( * ) Notice: Subject to any disclaimer, the term of this patent is extended or adjusted under 35 U.S.C. 154(b) by 0 days.

(21) Appl. No.: 16/361,079

(22) Filed: Mar. 21, 2019

(65) Prior Publication Data

US 2019/0295237 A1    Sep. 26, 2019

Related U.S. Application Data

(60) Provisional application No. 62/647,563, filed on Mar. 23, 2018.

(51) Int. Cl.
*G01N 21/95* (2006.01)
*G01N 21/956* (2006.01)
(Continued)

(52) U.S. Cl.
CPC ......... *G06T 7/001* (2013.01); *G01N 21/9501* (2013.01); *G01N 21/956* (2013.01);
(Continued)

(58) Field of Classification Search
CPC ............. G01N 21/9501; G01N 21/956; G01N 23/2251; G01N 2223/401; G06K 9/6201;
(Continued)

(56) References Cited

U.S. PATENT DOCUMENTS 7,570,796 B2    8/2009  Zafar et al.
7,676,077 B2    3/2010  Kulkarni et al.
(Continued)

FOREIGN PATENT DOCUMENTS

WO    2014/028513    2/2014

OTHER PUBLICATIONS

Le Denmat et al. ("Device specific characterization of yield limiting pattern geometries by combining layout profiling with high sensitivity wafer inspection," 26th Advanced Semiconductor Manufacturing, IEEE/SEMI Conference and Workshop, May 3-6, 2015) (Year: 2015).*

(Continued)

*Primary Examiner* — Yubin Hung
(74) *Attorney, Agent, or Firm* — Ann Marie Mewherter

(57) ABSTRACT

Methods and systems for determining boundaries of patterned features formed on a specimen from an unresolved image of the specimen are provided. One system includes computer subsystem(s) configured for comparing a difference image in which patterned feature(s) are unresolved to different simulated images. The different simulated images are generated by simulating difference images generated for the patterned feature(s) formed on the specimen with different perturbations, respectively. The computer subsystem(s) are configured for, based on the comparing, assigning an amplitude to each of the different perturbations. The computer subsystem(s) are further configured for determining one or more boundaries of the patterned feature(s) formed on the specimen by applying the different perturbations to one or more designed boundaries of the patterned feature(s) with the assigned amplitudes.

18 Claims, 6 Drawing Sheets

(51) Int. Cl.
*G06T 7/00* (2017.01)
*G01N 23/2251* (2018.01)
*G06T 7/12* (2017.01)
*G06K 9/62* (2006.01)
*G06T 3/40* (2006.01)
*G06T 7/174* (2017.01)

(52) U.S. Cl.
CPC ....... *G01N 23/2251* (2013.01); *G06K 9/6201* (2013.01); *G06T 3/4053* (2013.01); *G06T 7/0006* (2013.01); *G06T 7/12* (2017.01); *G06T 7/174* (2017.01); *G01N 2223/401* (2013.01); *G06T 2207/20224* (2013.01); *G06T 2207/30148* (2013.01)

(58) Field of Classification Search
CPC ..... G06T 3/4053; G06T 7/0006; G06T 7/001; G06T 7/12; G06T 7/174; G06T 2207/10056; G06T 2207/20224; G06T 2207/30148
See application file for complete search history.

(56) References Cited

U.S. PATENT DOCUMENTS

| | | | |
|---|---|---|---|
| 8,126,255 B2 | 2/2012 | Bhaskar et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 2006/0159333 A1 | 7/2006 | Ishikawa | |
| 2008/0219545 A1* | 9/2008 | Chen | G06T 7/001 382/145 |
| 2010/0021043 A1 | 1/2010 | Preil et al. | |
| 2010/0034477 A1* | 2/2010 | Crisan | G06T 3/4053 382/244 |
| 2010/0177973 A1* | 7/2010 | Wedi | G06T 5/50 382/233 |
| 2011/0090378 A1* | 4/2011 | Wang | G06T 5/003 348/242 |
| 2011/0267508 A1* | 11/2011 | Kane | G06T 7/529 348/241 |
| 2015/0168303 A1 | 6/2015 | Trupke et al. | |
| 2015/0309402 A1* | 10/2015 | Levinski | G03F 1/42 356/247 |
| 2016/0292840 A1* | 10/2016 | Konecky | G06T 7/001 |
| 2017/0148226 A1 | 5/2017 | Zhang | |
| 2017/0154408 A1* | 6/2017 | Jobara | G06T 3/4038 |

OTHER PUBLICATIONS

International Search Report and Written Opinion for PCT/US2019/023586 dated Jul. 12, 2019.

* cited by examiner

AIDED IMAGE RECONSTRUCTION

BACKGROUND OF THE INVENTION

1. Field of the Invention

This invention generally relates to methods and systems for design aided image reconstruction. Some embodiments include determining boundaries of one or more patterned features formed on a specimen from an unresolved image of the one or more patterned features on the specimen.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

As design rules shrink, it becomes increasingly difficult to generate test images for inspection in which the features formed on the specimen are resolved. For example, inspection systems are generally designed for scanning relatively large areas on a specimen in a relatively short amount of time. Therefore, inspection systems tend to sacrifice resolution for speed. In many inspection systems used today, the features on the specimen are simply too small to be resolved by the inspection systems. This situation is encountered in optical inspection as well as other types of inspection such as electron beam inspection. For example, in order to make electron beam inspection possible, typically even if the electron beam system is capable of generating images in which the patterned features on the specimen are resolved, the system is used with a lower resolution to make electron beam inspection practical and cost effective.

Deconvolution microscopy is an area of scientific research with the aim of increasing resolution of microscope images algorithmically. It uses a mathematical model of blurring caused by the finite resolution of microscopes. The algorithm acts on microscope images with the mathematical inverse of the blurring model in order to numerically undo the blurring. Some currently available software determines boundaries of resolvable patterns on masks used for lithography.

Unfortunately, the mathematic inverse of the blurring process is extremely unstable and has limited value in the presence of experimental noise. As a result, deconvolution microscopy is at best able to sharpen microscopy images, but cannot recover features of a sample well below the resolution limit.

Some currently available software used for mask inspection is intended to be used on images in which the structures are resolvable given the resolution of the imaging hardware used for acquisition. Similar to deconvolution microscopy, it's goal is to sharpen and more precisely determine the location of features that are already resolved. It is not expected to work on either patterned wafers or future generations of masks, in which many of the patterns are unresolved in inspection images.

Accordingly, it would be advantageous to develop systems and/or methods for determining boundaries of patterned feature(s) formed on a specimen from an unresolved image of the patterned feature(s) formed on the specimen that do not have one or more of the disadvantages described above.

SUMMARY OF THE INVENTION

The following description of various embodiments is not to be construed in any way as limiting the subject matter of the appended claims.

One embodiment relates to a system configured to determine boundaries of one or more patterned features formed on a specimen from an unresolved image of the one or more patterned features on the specimen. The system includes an inspection subsystem that includes at least an energy source and a detector. The energy source is configured to generate energy that is directed to a specimen. The detector is configured to detect energy from the specimen and to generate images responsive to the detected energy. One or more patterned features formed on the specimen are unresolved in the images generated by the detector.

The system also includes one or more computer subsystems configured for generating a difference image for the one or more patterned features by subtracting a reference image from one of the images generated by the detector for the one or more patterned features. The computer subsystem(s) are also configured for comparing the difference image to different simulated images. The different simulated images are generated by simulating difference images generated for the one or more patterned features formed on the specimen with different perturbations, respectively. In addition, the computer subsystem(s) are configured for, based on results of the comparing, assigning an amplitude to each of the different perturbations. The computer subsystem(s) are further configured for determining one or more boundaries of the one or more patterned features formed on the specimen by applying the different perturbations to one or more designed boundaries of the one or more patterned features with the assigned amplitudes. The system may be further configured as described herein.

Another embodiment relates to a computer-implemented method for determining boundaries of one or more patterned features formed on a specimen from an unresolved image of the one or more patterned features on the specimen. The method includes steps for each of the functions of the one or more computer subsystems described above. The steps of the method are performed by one or more computer subsystems. The method may be performed as described further herein. In addition, the method may include any other step(s) of any other method(s) described herein. Furthermore, the method may be performed by any of the systems described herein.

An additional embodiment relates to a non-transitory computer-readable medium storing program instructions executable on a computer system for performing a computer-implemented method for determining boundaries of one or more patterned features formed on a specimen from an unresolved image of the one or more patterned features on the specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Other objects and advantages of the invention will become apparent upon reading the following detailed description and upon reference to the accompanying drawings in which.

Figure 1:
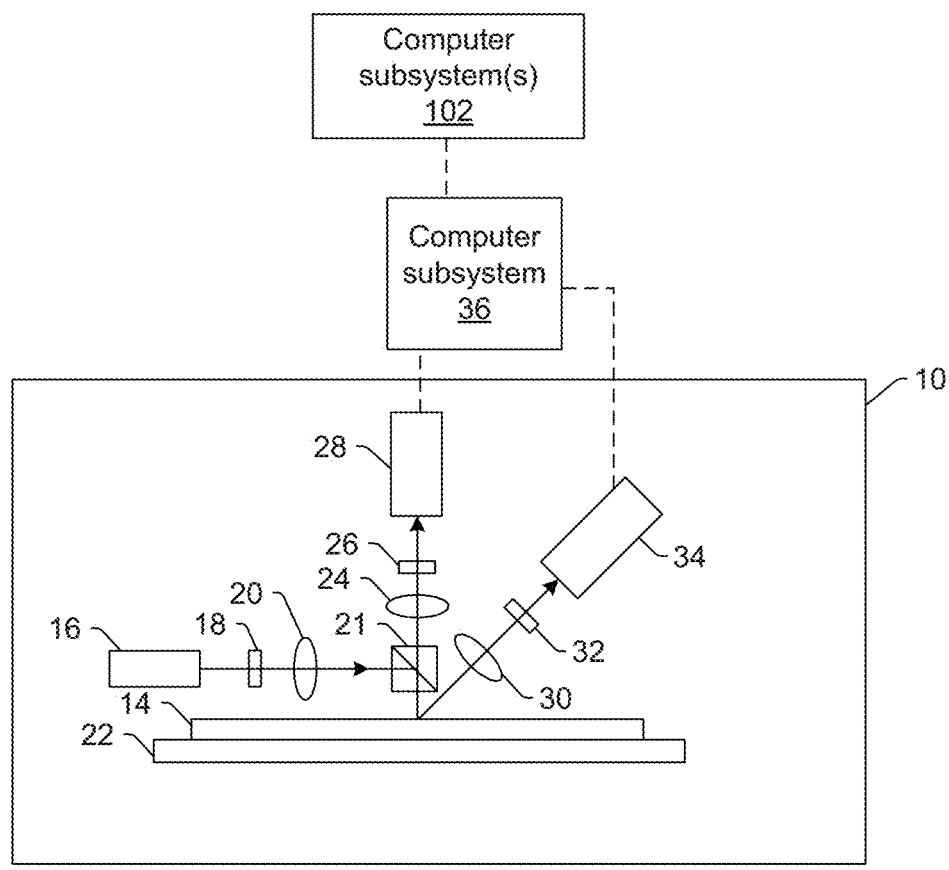
FIGS. 1 and 2 are schematic diagrams illustrating side views of embodiments of a system configured as described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design" and "design data" as used herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In general, however, the design information or data cannot be generated by imaging a wafer with a wafer inspection system. For example, the design patterns formed on the wafer may not accurately represent the design for the wafer and the wafer inspection system may not be capable of generating images of the design patterns formed on the wafer with sufficient resolution such that the images could be used to determine information about the design for the wafer. Therefore, in general, the design information or design data cannot be generated using a physical wafer. In addition, the "design" and "design data" described herein refers to information and data that is generated by a semiconductor device designer in a design process and is therefore available for use in the embodiments described herein well in advance of printing of the design on any physical wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to determine boundaries of one or more patterned features formed on a specimen from an unresolved image of the one or more patterned features on the specimen. In this manner, the embodiments described herein may be configured to perform design aided image (defect image) reconstruction. The embodiments can determine sub-resolution features of defects on patterned wafers. This information can be used to distinguish defects of interest (DOIs) from nuisance and system noise during optical (or another type of) inspection.

"Nuisances" as that term is used herein are defects that a user does not care about and/or defects that are detected as such but are not actually defects. Nuisances that are not actually defects even though they are detected as such may be detected due to non-defect noise sources on a specimen (e.g., line edge roughness (LER), relatively small critical dimension (CD) variation in patterned features, thickness variations, etc.) and/or due to marginalities in the inspection system itself or its configuration used for inspection. Generally, therefore, the goal of inspection is not to detect nuisances on specimens such as wafers.

The embodiments also work well for other types of samples such as reticles. The embodiments can be used with other imaging techniques such as electron microscopy and x-ray imaging. In general, the embodiments allow one to image sub-resolution differences between a sample and a known reference by using measured images of the specimen, knowledge of the reference, and a model of the image formation process. "Sub-resolution" as that term is used herein is generally defined as smaller than a resolution limit of an inspection subsystem.

Even when the differences between DOI and nuisances are sub-resolution, there are often measurable differences in the signals they produce. In one example, a DOI that is a protrusion extending from a line and having dimensions of 10 nm×10 nm and a nuisance that is a protrusion extending from the same line and having dimensions of 100 nm×1 nm (where the protrusion extends from the line by 1 nm along a 100 nm portion of the line) have the same total area and may generate a similar amount of signal. However, the nuisance signal will be slightly broader than the DOI signal. Determining the source of these signals (whether they are due to DOIs or nuisances) is complicated by any noise in the images.

The embodiments described herein, however, provide a way to determine the source of a defect signal in a relatively noisy image. The embodiments described herein advantageously limit the number of possible solutions by using the design for the specimen. For example, the embodiments described herein use design information to turn deconvolution into a multiple choice problem. In addition, the embodiments described herein are general enough to account for variation among DOI and nuisances.

In one embodiment, the specimen includes a wafer. In another embodiment, the specimen includes a reticle. The wafer and the reticle may include any wafer and reticle known in the art.

One embodiment of such a system is shown in FIG. 1. The system includes an inspection subsystem that includes at least an energy source and a detector. The energy source is configured to generate energy that is directed to a specimen. The detector is configured to detect energy from the specimen and to generate images responsive to the detected energy.

In one embodiment, the energy directed to the specimen includes light, and the energy detected from the specimen includes light. In the embodiment of the system shown in FIG. 1, inspection subsystem 10 includes an illumination subsystem configured to direct light to specimen 14. The illumination subsystem includes at least one light source. For example, as shown in FIG. 1, the illumination subsystem includes light source 16. The illumination subsystem may be configured to direct the light to the specimen at one or more angles of incidence, which may include one or more oblique angles and/or one or more normal angles. For example, as shown in FIG. 1, light from light source 16 is directed through optical element 18 and then lens 20 to beam splitter 21, which directs the light to specimen 14 at a normal angle of incidence. The angle of incidence may include any suitable angle of incidence, which may vary depending on, for instance, characteristics of the specimen and the defects to be detected on the specimen.

The illumination subsystem may be configured to direct the light to the specimen at different angles of incidence at different times. For example, the inspection subsystem may be configured to alter one or more characteristics of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different angle of incidence.

In some instances, the inspection subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing light having different or the same characteristics to the specimen at different or the same angles of incidence sequentially or simultaneously.

In one embodiment, light source 16 includes a broadband plasma (BBP) light source. In this manner, the light generated by the light source and directed to the specimen may include broadband light. However, the light source may include any other suitable light source such as a laser, which may include any suitable laser known in the art and may be configured to generate light at any suitable wavelength(s) known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection subsystem may also include a scanning subsystem configured to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the inspection subsystem may be configured such that one or more optical elements of the inspection subsystem perform some scanning of the light over the specimen. The light may be scanned over the specimen in any suitable fashion.

The inspection subsystem further includes one or more detection channels. At least one of the one or more detection channels includes a detector configured to detect light from the specimen due to illumination of the specimen by the inspection subsystem and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the specimen (e.g., specularly reflected light). Although FIG. 1 shows an embodiment of the inspection subsystem that includes two detection channels, the inspection subsystem may include a different number of detection channels (e.g., only one detection channel or two or more detection channels). Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art such as photo-multiplier tubes (PMTs), charge coupled devices (CCDs), and time delay integration (TDI) cameras. The detectors may be configured as imaging detectors that are configured to generate imaging signals or image data.

It is noted that FIG. 1 is provided herein to generally illustrate a configuration of an inspection subsystem that may be included in the system embodiments described herein. Obviously, the inspection subsystem configuration described herein may be altered to optimize the performance of the system as is normally performed when designing a commercial inspection system. In addition, the systems described herein may be implemented using an existing inspection system (e.g., by adding functionality described herein to an existing inspection system) such as the 28xx and 29xx series of tools that are commercially available from KLA, Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem 36 of the system may be coupled to the detectors of the inspection subsystem in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 (as shown by the dashed line in FIG. 1) by any suitable transmission media, which may include any suitable wired and/or wireless transmission media known in the art. Two or more of such computer subsystems may also be effectively coupled by a shared computer-readable storage medium (not shown).

Although the inspection subsystem is described above as being an optical or light-based inspection subsystem, the inspection subsystem may be an electron beam-based inspection subsystem. For example, in one embodiment, the energy directed to the specimen includes electrons, and the energy detected from the specimen includes electrons. In this manner, the energy source may be an electron beam source. In one such embodiment shown in FIG. 2, the inspection subsystem includes electron column 122, which is coupled to computer subsystem 124.

Figure 2:
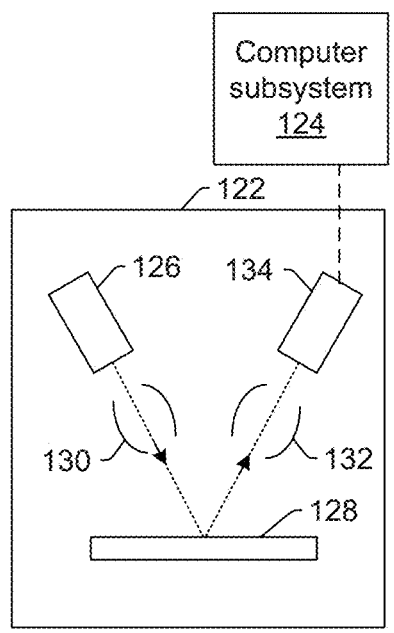

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam-based subsystem may be configured to use multiple modes to generate images of the specimen (e.g., with different illumination angles, collection angles, etc.). The multiple modes of the electron beam-based subsystem may be different in any image generation parameters of the subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform any of the functions described herein using the output of the detector and/or the electron beam images. Computer subsystem 124 may be configured to perform any additional step(s) described herein. A system that includes the inspection subsystem shown in FIG. 2 may be further configured as described herein.

It is noted that FIG. 2 is provided herein to generally illustrate a configuration of an electron beam subsystem that may be included in the embodiments described herein. As with the optical inspection subsystem described above, the electron beam subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the tools that are commercially available from KLA. For some such systems, the methods described herein may be provided as optional functionality of the system (e.g., in addition to other functionality of the system). Alternatively, the system described herein may be designed "from scratch" to provide a completely new system.

Although the inspection subsystem is described above as being a light-based or electron beam-based inspection subsystem, the inspection subsystem may be an ion beam-based inspection subsystem. Such an inspection subsystem may be configured as shown in FIG. 2 except that the electron beam source may be replaced with any suitable ion beam source known in the art. In addition, the inspection subsystem may be any other suitable ion beam subsystem such as those included in commercially available focused ion beam (FIB) systems, helium ion microscopy (HIM) systems, and secondary ion mass spectroscopy (SIMS) systems.

As noted above, the inspection subsystem is configured for scanning energy (e.g., light or electrons) over a physical version of the specimen thereby generating actual images for the physical version of the specimen. In this manner, the inspection subsystem may be configured as an "actual" subsystem, rather than a "virtual" subsystem. However, a storage medium (not shown) and computer subsystem(s) 102 shown in FIG. 1 may also or alternatively be configured as a "virtual" system. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents. For example, the one or more computer subsystems described herein may be further configured as described in these patents.

As further noted above, the inspection subsystem may be configured to generate images of the specimen with multiple modes. In general, a "mode" is defined by the values of parameters of the inspection subsystem used for generating images of a specimen. Therefore, modes that are different may be different in the values for at least one of the imaging parameters of the inspection subsystem. For example, in one embodiment of an optical subsystem, different modes use at least one different wavelength of light for illumination. The modes may be different in the illumination wavelength as described further herein (e.g., by using different light sources, different spectral filters, etc.) for different modes. In another example, as noted above, the inspection subsystem may include more than one illumination channel, and different illumination channels may be used for different modes.

The one or more patterned features formed on the specimen are unresolved in the images generated by the detector. For example, the dimensions of the patterned feature(s) as formed on the specimen may be below the resolution of the inspection subsystem, meaning that they cannot be resolved in images of the patterned feature(s) generated by the detector(s) of the inspection subsystem. The embodiments described herein overcome the limitations of deconvolution microscopy described herein by using design information and difference imaging. For example, the one or more computer subsystems are configured for generating a difference image for the one or more patterned features by subtracting a reference image from one of the images generated by the detector for the one or more patterned features. Subtracting the reference image from the one image may be performed in any suitable manner. For example, many defect detection methods generate difference images, and any of those defect detection methods may be used in the generating step. The reference image may be any suitable reference image such as an image from another die or cell on the specimen or a reference image generated from design data for the specimen. The image from which the reference is subtracted may be any suitable test image generated by the detector and having any suitable size (e.g., patch images, jobs, frame images, etc.).

The design information contains information for the shapes and sizes of all the patterned structures on the wafer or reticle. We know a priori that the image we seek to recover (reconstruct) should look almost exactly like the design except for relatively small deviation(s). Thus, the deconvolution problem is reduced to finding the simplest change to the design that is consistent with the difference between the measured images of the specimen and the reference.

The one or more computer subsystems are also configured for comparing the difference image to different simulated images, and the different simulated images are generated by simulating difference images for the one or more patterned features formed on the specimen with different perturbations, respectively. The terms "perturbations" and "deviations" are used interchangeably herein. In one embodiment, the computer subsystem(s) are configured for generating the simulated difference images, and the simulating includes simulating an image generated by the detector for the one or more patterned features formed on the specimen with one of the different perturbations and subtracting the reference image for the one or more patterned features from the simulated image to thereby generate one of the simulated difference images. In this manner, the embodiments described herein may use design information (such as that which may be used to generate the simulated difference images) in combination with measured difference images. For example, the computer subsystem(s) may simulate the difference images that would be generated for patterned features in the design formed on the specimen with various deviations resulting from possible DOI and various types of expected nuisance, including wafer structure variation referred to as noise (e.g., LER).

The difference images may be simulated for one or more DOIs and one or more nuisances occurring at all possible locations allowed for by the design. For example, in one embodiment, the different perturbations include deviations in the one or more boundaries of the one or more patterned features at two or more different positions along the one or more boundaries. In one such example, the design includes a set of shapes (polygons) that represent objects that the user wants to fabricate on the specimen. Due to the imperfections of the manufacturing process, what is actually fabricated on the specimen differs from the design. These differences can be described as changes to the edges of the polygons. A change (DOI or nuisance) can occur at any point along the edge or boundary of any polygon. Each of the different positions or locations may be defined around the edge of each polygon (with some finite step size), and the simulations may be performed for each location.

The set of all simulation outputs (i.e., different simulated difference images) is also referred to herein as a "dictionary," and the individual simulation outputs are referred to as "atoms." In other words, each atom is the result of a simulation performed as described herein. Each atom contains all of the pixels in a field of view around a location of the associated change in a polygon. A dictionary and the atoms included therein may be created before run time (i.e., before an actual inspection of a specimen and/or in setup of an inspection recipe). In addition, a dictionary and the atoms included therein may be generated only once for a given wafer layer and then used for any wafers having the same layer formed thereon and being inspected by the inspection subsystem.

In one embodiment, the comparing includes finding a combination of the smallest number of the different simulated images that generates the closest approximation to the difference image. For example, the computer subsystem(s) may solve for the smallest combination of atoms that generates a substantially close approximation of the measured difference image. The computer subsystem(s) are more likely to select atoms associated with a DOI when the signal in the difference image is caused by a DOI. The same is true for sources of nuisance. In one embodiment, the comparing is performed using Matching Pursuit. For example, in order to find the smallest combination of atoms, Matching Pursuit may be used, which is one of many so called "L1 minimization" algorithms that look for sparse (i.e., compressible) representations of signals.

The computer subsystem(s) are configured for, based on results of the comparing, assigning an amplitude to each of the different perturbations. For example, the computer subsystem(s) may assign each selected atom an amplitude. Any non-selected atoms may be assigned an amplitude of zero or may simply be eliminated from any further calculations. In particular, users are interested in the shapes of patterned features that have been fabricated on a specimen. However, in many cases today, these patterned features are much smaller and closer together than the resolution of the inspection subsystem. The embodiments described herein are designed to deal with that by assuming that what is on the specimen is similar to what is in the design and to solve for perturbations to the shapes of the patterned features, i.e., what is on the specimen=design+small changes. The intention of the comparing step is then to use a list of the "usual suspects," i.e., common types of imperfections that could cause the signal that is measured, to thereby find the perturbations. In particular, these common types of imperfections are used to generate the different simulated images as described herein, and then those different simulated images are used in the comparing step.

In this manner, each of the different simulated images may be generated for a different one of the usual suspects. The different simulated images are compared to the difference image generated for the specimen. Based on results of the comparisons, the computer subsystem(s) assign each "suspect" an amplitude. The relatively small changes to the shapes of the patterned features are represented as a summation of each "suspect" multiplied by its associated amplitude, i.e., small changes=amplitude1*suspect1+amplitude2*suspect2+amplitude3*suspect3+ . . . +amplitudeN*suspectN. Thus, by solving for the amplitude of each suspect, the computer subsystem(s) determine what the relatively small changes to the design are on the specimen compared to the design in the data.

The computer subsystem(s) are further configured for determining one or more boundaries of the one or more patterned features formed on the specimen by applying the different perturbations to one or more designed boundaries of the one or more patterned features with the assigned amplitudes. For example, the computer subsystem(s) may modify the design by making the change(s) to the design associated with each selected atom by an amount determined by the amplitude of the atom. In this manner, by using the difference images generated for the specimen, the computer subsystem(s) can determine how the patterned features on the specimen are different from the patterned features in the design and then apply those differences to the patterned features in the design to generate information (i.e., a new image) that illustrates how the patterned features are formed on the specimen.

There are several major differences between the embodiments described herein and mask inspection methods and systems. For example, the embodiments described herein are designed for wafers (or other specimens) with sub-resolution patterns vs. masks with resolvable patterns. In particular, in one embodiment, the one or more patterned features cannot be resolved in the images generated by the detector. Since the patterns are unresolved, it may be advantageous to use regularization to constrain the possible solutions. For example, in one embodiment, the comparing is performed with regularization to constrain finding a solution for the combination by representing the solution as a linear combination of functions in which the solution is relatively sparse. In this manner, the embodiments described herein may regularize the problem by representing the solution as a linear combination of functions in which the solution will be relatively sparse. The linear combination may be, as described further herein, a summation where each function is multiplied by a number and then they are all added together, i.e., small changes=amplitude1*suspect1+amplitude2*suspect2+amplitude3*suspect3+ . . . +amplitudeN*suspectN. These functions may be chosen based on a priori information about the probable sources of the defect signal. Algorithms for mask inspection do not use regularization.

The embodiments described herein also use a different procedure for minimizing the differences between measurement and simulation than mask inspection. For example, mask inspection algorithms use gradient descent to update the mask boundaries, while the embodiments described herein test trial solutions and update the patterned feature boundaries by choosing a relatively small set of the trial solutions and determining their amplitudes. Furthermore, in mask inspection, a measured target image is used as the data, as opposed to the embodiments described herein which use a measured difference (i.e., target−reference) image as its input. Simulations of wafer measurements are less accurate than those of masks. Using a measured difference image causes some of the discrepancies between simulation and experiment to be subtracted out.

In summary, the embodiments described herein differ from deconvolution microscopy because they solve for relatively small deviations from a known design. They differ from algorithms used in mask inspection because they are designed to work on specimens (e.g., wafers) with patterns that are not resolved by the inspection subsystem.

Further details of the above-described steps will now be described. In one embodiment, the different perturbations include deviations to the one or more boundaries of the one or more patterned features due to known DOIs and known nuisances. For example, the boundaries of the structures in the design of a patterned wafer or other specimen described herein can be represented by some function, $f_{design}(l)$, where l denotes the position along the boundary of a patterned feature. Due to limits in manufacturing, the actual boundaries on the specimen will differ from those in the design by a small amount such as $\Delta n(l)$ such that $f_{specimen}(l)=f_{design}(l)+\Delta n(l)$. The invention determines $\Delta n(l)$ by utilizing $f_{design}(l)$ in conjunction with a measured difference image from an inspection subsystem.

Figure 3:
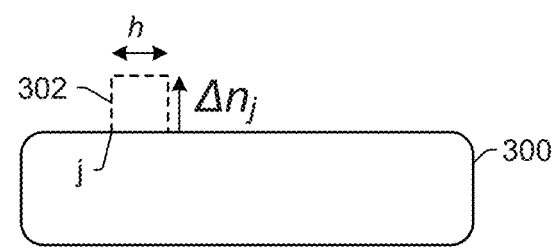
FIGS. 3-4 are schematic diagrams illustrating plan views of examples of one or more patterned features formed on a specimen with different possible perturbations.

Changes in intensity (in a difference image) are related to a change in the boundary of a patterned feature on a specimen from the designed boundary. Relatively small changes in the measured image can be related to relatively small changes in the shape of patterned features on the specimen (as shown in FIG. 3) using the following equation:

$$\Delta I_i = \sum_j^N \frac{\partial I_i}{\partial n_j} \Delta n_j$$

Here $\Delta I_i$, the change in intensity, is the grey level of the difference (target−reference) image at pixel i, $\Delta n_j$ is the distance normal to the edge of a patterned feature that a point on the edge is displaced, and N is the number of points in the design. In this manner, the equation relates the intensity in the difference image to relatively small changes in the design. For example, FIG. 3 shows small deviation 302 in shape 300 at point j between the design of a patterned feature and what is on the specimen. The deviation has width h equal to the distance between points specifying the shape. The computer subsystem(s) determine the height $\Delta n_j$ at each boundary point where $\Delta n_j$ is the deviation of the edge from the design. The matrix of partial derivatives $\partial I/\partial n$, the partial derivative of the intensity with respect to design, denotes the rate at which the optical intensity at each detector pixel changes as the location of each edge point is changed. For an incoherent imaging system:

$$\frac{\partial I_i}{\partial n_j} = hG(x_i, x_j)R(x_j),$$

where h is the distance between points specified by the design, G is the intensity Greens (Transfer) function from design point j to detector i, and R is the nearfield intensity. For a coherent (or partially coherent) system:

$$\frac{\partial I_i}{\partial n_j} = 2h \operatorname{Real}\left(G*(x_i, x_j)R*(x_j)\int d^2x' G(x_i, x')R(x')\right)$$

where h is the distance between points specified by the design, G is the electric field Greens (Transfer) function from design point j to detector i, and R is the near-field electric field. In the current implementation, the near-field intensity and electric field are approximated using a modified form of the Kirchhoff approximation. As described further herein, it may be possible to use more sophisticated simulation methods to determine R(x). Using one of the above relationships will drastically decrease the number of unknowns by transforming the two-dimensional deconvolution problem with about $N^2$ unknowns into a one-dimensional problem with about N unknowns.

In order to determine the changes to the design denoted by $\Delta n_j$, using the difference image $\Delta I$, the first equation must be inverted. When imaging specimens with sub-resolution features, the inversion process is unstable, and the problem must be regularized. As described further herein, there are several potential methods for performing both the regularization and the inversion. The current implementation chooses among solutions that agree with the data, solutions that can be described by a relatively small number of coefficients. For example, as described further herein, the computer subsystem(s) solve this equation for the changes from the design on the specimen by choosing, from among a dictionary of functions, the simplest change in the design that reproduces the difference image. One implementation that may be performed by the embodiments described herein and shown in FIG. 5 works as follows.

Figure 4:
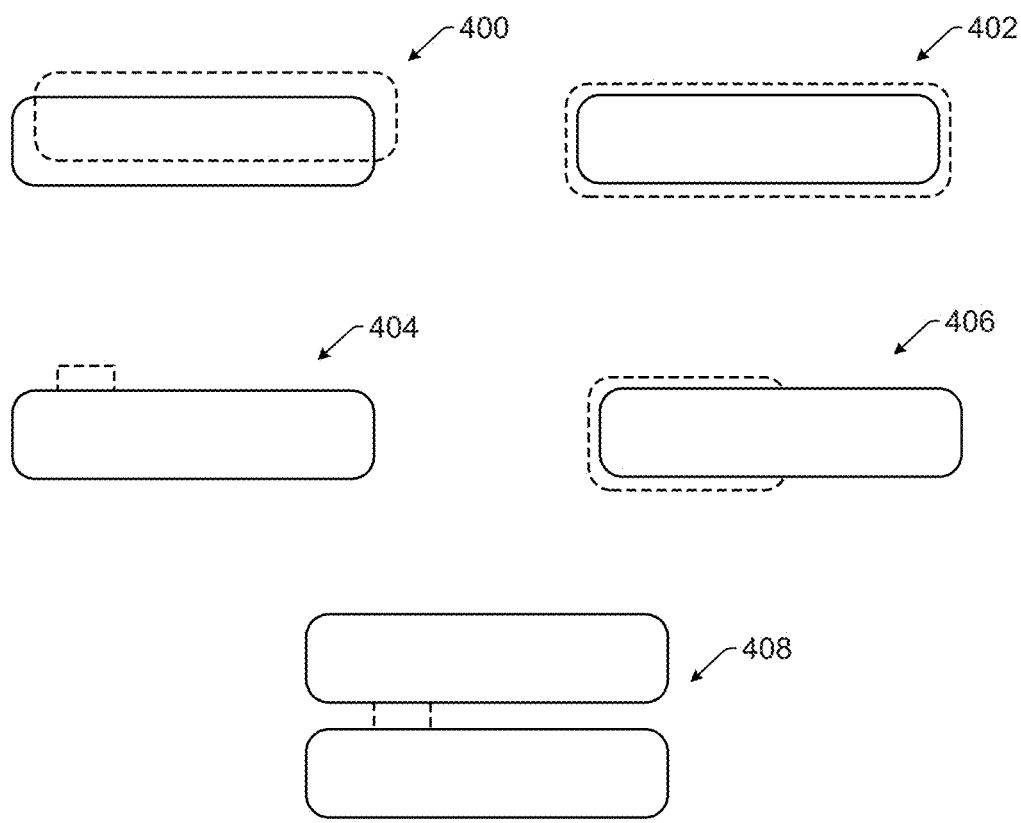
Figure 5:
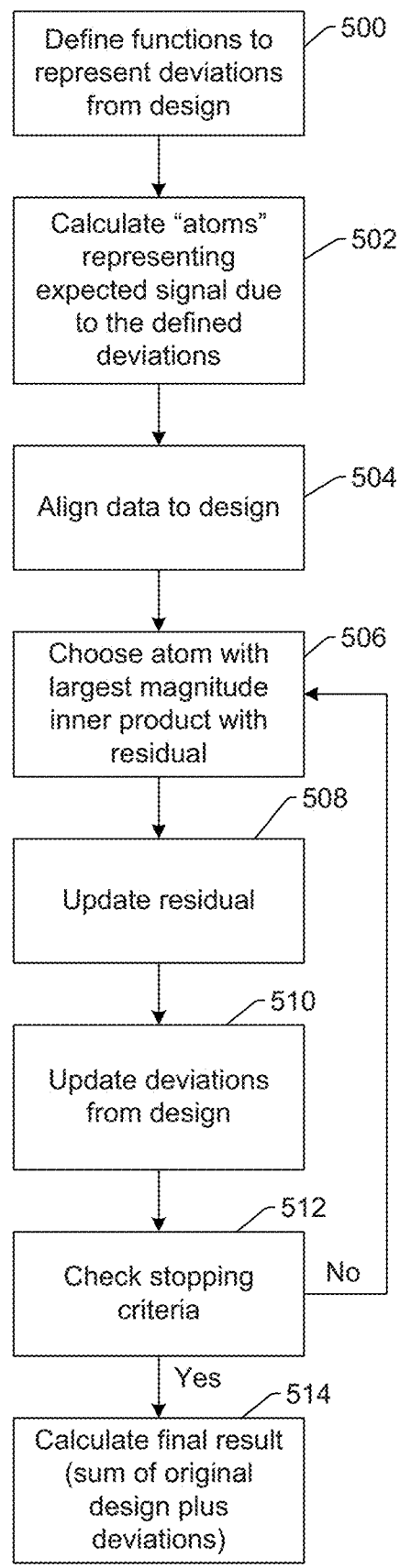
FIG. 5 is a flow diagram illustrating one embodiment of steps that may be performed by system embodiments described herein.

As shown in step 500 of FIG. 5, the computer subsystem(s) may define functions to represent deviations from the design. In other words, the computer subsystem(s) may generate a list of possible deviations from the design so that the computer subsystem(s) can distinguish between them. The solution $\Delta n(l)$ is represented as a summation of functions $b_m(l)$ with unknown coefficients $c_m$:

$$\Delta n(l) = \sum_m c_m b_m(l),$$

where l denotes the position along the boundary of a patterned feature in the design. The set of functions $b_m(l)$ is chosen such that it redundantly spans the space of $\Delta n(l)$. That is, for any functions $\Delta n(l)$ there are multiple linear combinations of the $b_m(l)$ that are equal to $\Delta n(l)$. The functions $b_m(l)$ correspond to deviations in the design that may occur when the specimen is fabricated with the design such as protruding/missing material of various shapes and locations, bridges/opens, growth/shrinkage of structures, and incorrect positioning of structures. FIG. 4 illustrates some examples of such deviations. Designed boundaries of the patterned features are shown in FIG. 4 by solid lines while the boundaries of the patterned features formed on the specimen are shown in FIG. 4 by dashed lines. Therefore, FIG. 4 shows schematics of the functions $b_m(l)$ that correspond to deviations (dashed lines) to the design (solid lines)

that may occur when the specimen is fabricated. Example 400 illustrates a possible deviation in position, example 402 illustrates a possible deviation in size, example 404 illustrates a possible deviation due to protruding/missing material, example 406 illustrates a possible deviation due to uneven size, and example 408 illustrates a possible deviation due to bridges/opens. The possible perturbations may also include defect sources such as bridges, protrusions, line opens, as well as various types of nuisances including irregular pattern and process variation. The functions $b_m(l)$ can also be abstract functions such as wavelets and sinusoids. In this manner, the perturbations can be represented by mathematical functions such as Gaussians, sinusoids, and wavelets.

As shown in step 502, the computer subsystem(s) may calculate "atoms" representing expected signals due to defined deviations. For each function $b_m(l)$, the computer subsystem(s) may calculate a normalized "atom." Each atom represents the expected change in signal $\Delta I$, due to a relatively small change $b_m(l)$ in the design. The atoms are calculated as:

$$a_m = \frac{\frac{\partial I}{\partial n} b_m(l)}{\left|\frac{\partial I}{\partial n} b_m(l)\right|}.$$

In this manner, a type of simulation may be performed by the computer subsystem(s) to predict the difference image that would result from each deviation. Possible simulation methods include convolution, extended source models, sum of coherent systems, rigorous coupled wave approximation, finite difference time domain, and finite element method.

As shown in step 504, the computer subsystem(s) may align the data to the design. The measured difference image is aligned to the design. In particular, by aligning a simulation of the design to the measured reference image, the design is by default also aligned to the measured difference image.

The embodiments described herein use trial solutions based on suspected sources of defect signal (the different perturbations of the patterned features for which the simulated difference images are generated). As shown in step 506, the computer subsystem(s) may choose an atom with the largest magnitude inner product with residual. The computer subsystem(s) take the inner product of each atom with the measured difference image and select the atom that has the largest magnitude inner product with the difference image:

$$M = \underset{m}{\operatorname{argmax}}(|\langle a_m, \Delta I \rangle|).$$

As described further herein, the idea of this step is to pick the atom that looks most similar to the measured difference image. The most likely cause of the signal in the measured difference image is the usual suspect that was used to generate this atom. One way to define "looks most similar to" mathematically is to pick the atom that is most correlated (or anti-correlated if the sign is reversed) with the measured image. Equivalently, this is the atom with the largest magnitude inner product with the measured difference image.

As shown in step 508, the computer subsystem(s) may update a residual. The computer subsystem(s) may calculate a residual by subtracting the selected atom from the current residual. On the first iteration, the residual is the difference image $\Delta I$. The atom is multiplied by the inner product from the above step before doing the subtraction such that $$\Delta I_{new} = \Delta I - a_M \langle a_M, \Delta I \rangle.$$

As shown in step 510, the computer subsystem(s) may update deviations from design. The computer subsystem(s) may update $\Delta n(l)$ (i.e., the boundaries of the patterned features in the design) according to:

$$\Delta n_{new} = \Delta n + \frac{\langle a_M, \Delta I \rangle b_M(l)}{\left|\frac{\partial I}{\partial n} b_M(l)\right|}.$$

As shown in step 512, the computer subsystem(s) may check stopping criteria. The computer subsystem(s) may determine whether to stop based on a criteria such as convergence or whether the computer subsystem(s) have performed a predetermined number of iterations. As described further herein, after the first atom is selected, that atom is assigned an amplitude. This amplitude is chosen so when it is multiplied by the atom, the sum squared error between the product and the measured difference image is minimized. The computer subsystem(s) may then subtract this product from the difference image, producing a new image that is called a residual. The process may then be repeated by the computer subsystem(s) by selecting another atom that correlates best with the residual, finding the atom's amplitude, and subtracting the product of amplitude times the atom from the residual to get a new residual. This process is repeated further to determine amplitudes for more atoms. As the computer subsystem(s) repeat this process, the sum squared of the residual converges to a relatively small value. If the computer subsystem(s) do not reach the stopping criteria, the computer subsystem(s) may go back (to step 506) to take the inner product of each atom with the measured difference image and selecting the atom that has the largest magnitude inner product with the difference image. If the computer subsystem(s) determine that the stopping criteria has been met, as shown in step 514, the computer subsystem(s) may calculate a final result (sum or original design plus deviations). The actual boundaries on the specimen can be determined according to $f_{specimen}(l) = f_{design}(l) + \Delta n(l)$.

The computer subsystem(s) may also find a relatively sparse solution to the resulting system of equations. The inventors have tested an L1-regularization method called Matching Pursuit. Matching Pursuit is a sparse approximation algorithm that finds the "best matching" projections of multi-dimensional data onto the span of an over-complete (i.e., redundant) dictionary D. The basic idea is to approximately represent a signal from Hilbert space as a weighted sum of finitely many functions (called atoms) taken from the dictionary D. Not every atom in D is used in the sum. Instead, Matching Pursuit may use choose the atoms one at a time to maximally (greedily) reduce the approximation error. This can be achieved by finding the atom that has the highest inner product with the signal (assuming the atoms are normalized), subtracting an approximation that uses only that atom from the signal, and repeating the process until the signal is satisfactorily decomposed, i.e., the normal of the residual is small. If the normal of the residual converges quickly to zero, then only a few atoms are needed to get a good approximation to the signal. Such sparse representations are desirable. Matching Pursuit may otherwise be implemented by the computer subsystem(s) in any suitable manner known in the art. Other similar L1-regularization algorithms also exist and may be used in the embodiments described herein. Using a (L1) regularization to constrain the possible solutions is believed to be a new feature of the embodiments described herein. In addition, it may also be possible to use L2-regularization methods, which look for solutions with relatively small L2-norms that agree with the measured data.

Figure 6:
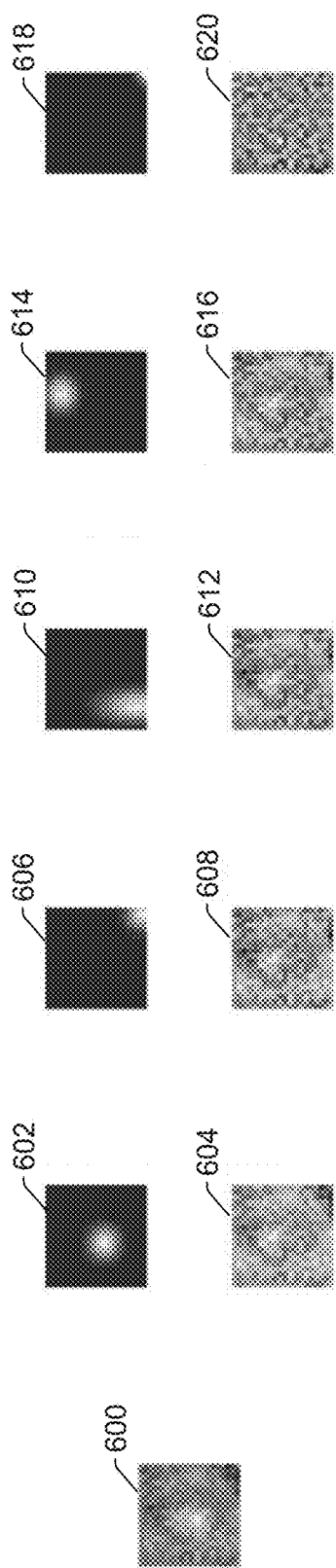
FIG. 6 includes an example of a difference image for which the embodiments described herein may be performed with examples of different simulated difference images corresponding to different possible perturbations of the patterned feature(s) for which the difference image was generated and residual images showing the differences between the difference image and the different simulated difference images.

FIG. 6 includes images that further illustrate the selection process for the "atoms" described above. As shown in FIG. 6, difference image 600 may be generated for a specimen. The difference image may be generated as described herein from an image generated for the specimen by a detector of an inspection subsystem configured as described herein. As described further herein, patterned features on the specimen are not resolved in the image generated by the detector. As such, the patterned features will not be resolved in the difference image (e.g., since the difference image is generated from the image generated by the detector).

The difference image is used in the comparing step described herein to find one or more of the simulated images or "atoms" that in combination approximate the difference image. This may be an iterative process as described above until some stopping criteria is met. For example, in a first step, atom 602 may be identified by the comparing step as approximating some portion of the difference image (e.g., the relatively bright portion shown in atom 602 may approximate the relatively bright portion near the center of the difference image). The difference image and the atom may then be used to generate residual 604. The residual (and other residuals described herein) may be generated as described above and may show the differences remaining after atom 602 is subtracted from the difference image. In addition, the residual may be determined as a difference between the difference image and the weighted sum of the selected atoms.

In a second step, atom 606 may be identified in the comparing step as approximating another portion of the difference mage (e.g., the high contrast portion shown in atom 606 may approximate the relatively high contrast portion near the lower right hand corner of the difference image). The difference image and atoms 602 and 606 (or residual 604 and atom 606) may then be used to generate residual 608. These steps may be repeated with atom 610 and residual 612, then atom 614 and residual 616, and so on until some stopping criteria is met in a final step in which atom 618 is identified and residual 620 is generated. Although 5 atoms (and therefore 5 iterations) are shown in FIG. 6, it is to be understood that the number of atoms included in the combination and the number of steps may be different from that shown in this figure. In this manner, the difference image generated for the specimen is "explained" by a relatively small number of atoms selected by the computer subsystem(s) described herein.

In one embodiment, the computer subsystem(s) are configured for detecting defects on the specimen based on the one or more determined boundaries. Detecting defects on the specimen may be performed in any suitable manner known in the art (e.g., applying a threshold to the determined boundaries and determining that any determined boundaries having a difference from the designed boundaries above the threshold corresponds to a defect or a potential defect) with any suitable defect detection method and/or algorithm. The "defects" that are detected based on the one or more determined boundaries may be more accurately referred to as "events" or "potential defects" that are possibly defects but also possibly not defects. For example, the "defects" that are detected on the specimen by the computer subsystem(s) may be determined as described further herein to be either DOIs or nuisances.

In another embodiment, the computer subsystem(s) are configured for detecting defects on the specimen based on the one or more determined boundaries and determining one or more sub-resolution features of the defects based on the one or more determined boundaries. For example, the design aided reconstruction described herein advantageously allows one to determine spatial features of patterned features on a specimen of a size much smaller than that of the resolution limit of the measured images. In particular, the computer subsystem(s) may be configured to determine size and shape of unresolved defects on patterned wafers (e.g., from the determined boundaries of the patterned features as compared to the designed boundaries of the patterned features).

In an additional embodiment, the one or more computer subsystems are configured for comparing the one or more determined boundaries and the one or more designed boundaries and determining if one or more differences between the one or more determined boundaries and the one or more designed boundaries are caused by one or more DOIs, one or more nuisances, or noise. For example, as described above, the computer subsystem(s) may determine spatial features on a specimen. This information can then be used to distinguish between DOIs, nuisances, and noise. Inspections of patterned wafers and other specimens described herein are generally limited by physical variation in patterned structures (referred to as nuisance) that generates signals similar in value to signals from DOIs. For example, DOIs and nuisances can often occur at the same locations. Even if the DOIs and nuisances do not occur at exactly the same location, they may be close enough so that they cannot be distinguished based on location. For example, it may not be possible to determine the detected defect locations accurately enough to distinguish between DOI and nuisance based on location. These variations are often irregularly shaped patterns that a user is not interested in. FIG. 4 shows typical examples of physical variations found on wafers. Whether these variations are considered DOI or nuisance depends on the current needs of the user. As such, it is crucial for the user to know the source of the measured signal.

In a further embodiment, the one or more computer subsystems are configured for generating a reconstructed image of the one or more patterned features from the one or more determined boundaries, and a resolution of the reconstructed image is higher than a resolution of the images generated by the detector. For example, the principle competition to optical inspection is electron beam inspection (EBI) because the increased resolution of EBI allows the user to visualize defects and determine what they are. In contrast, standard optical inspection only produces images that look like blurred spots. Thus, optical inspections may detect millions of events, but the user has no way of determining what causes them, limiting the usefulness of the optical inspection. In contrast, the design aided defect reconstruction described herein advantageously overcomes the limitations of deconvolution microscopy allowing the embodiments to produce substantially high resolution images of patterned wafers and other specimens. The substantially high resolution images facilitate the determination of the sources of signals produced during optical inspection of patterned wafers. In particular, the computer subsystem(s) described herein can reconstruct images of patterned wafers (and other specimens) based on images in which the patterns are not resolved. For example, the one or more determined boundaries may be used to reconstruct an image of the patterned features with a resolution higher than that possible on the inspection subsystem. In particular, the determined boundaries may be applied to the design data for the specimen to thereby generate a pseudo or reconstructed image for the specimen. The determined boundaries may however also be used to simulate an image for the specimen such as that which may be produced by a high resolution optical system or electron beam system capable of producing resolved images of the patterned features. Such a simulated image may be generated using one or more of the simulation methods described further herein or any other suitable simulation methods known in the art.

Design aided defect reconstruction as described herein, therefore, provides an opportunity to probe specimens at sub-resolution scales and determine the sources of measured signals. By modifying the design based on the acquired image(s), a substantially high resolution image is generated with resolution far beyond that of the acquired images. If successful, instrument resolution will become less important, and sensitivity more important, taking away the principle advantage of EBI. In addition, design aided reconstruction may provide a way to determine the source of optical signals from 3D wafers (e.g., 3D NAND) where the defects are buried and cannot be imaged with EBI.

Each of the embodiments of the system may be further configured according to any other embodiment(s) described herein.

Another embodiment relates to a computer-implemented method for determining boundaries of one or more patterned features formed on a specimen from an unresolved image of the one or more patterned features formed on the specimen. The method includes steps for each of the functions of the computer subsystem(s) described above. The inspection subsystem is configured as described herein.

Each of the steps of the method may be performed as described further herein. The method may also include any other step(s) that can be performed by the inspection subsystem and/or computer subsystem(s) or system(s) described herein. The steps of the method are performed by one or more computer subsystems, which may be configured according to any of the embodiments described herein. In addition, the method described above may be performed by any of the system embodiments described herein.

Figure 7:
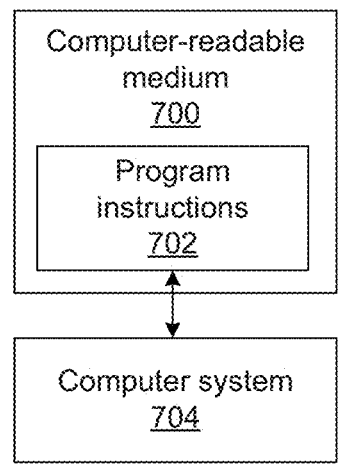
FIG. 7 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing a computer-implemented method for determining boundaries of one or more patterned features formed on a specimen from an unresolved image of the one or more patterned features formed on the specimen. One such embodiment is shown in FIG. 7. In particular, as shown in FIG. 7, non-transitory computer-readable medium 700 includes program instructions 702 executable on computer system 704. The computer-implemented method may include any step(s) of any method(s) described herein.

Program instructions 702 implementing methods such as those described herein may be stored on computer-readable medium 700. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 704 may be configured according to any of the embodiments described herein.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Further modifications and alternative embodiments of various aspects of the invention will be apparent to those skilled in the art in view of this description. For example, methods and systems for determining boundaries of one or more patterned features formed on a specimen from an unresolved image of the one or more patterned features on the specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to determine boundaries of one or more patterned features formed on a specimen from an unresolved image of the one or more patterned features on the specimen, comprising:

an inspection subsystem comprising at least an energy source and a detector, wherein the energy source is configured to generate energy that is directed to a specimen, wherein the detector is configured to detect energy from the specimen and to generate images responsive to the detected energy, and wherein one or more patterned features formed on the specimen are unresolved in the images generated by the detector; and one or more computer subsystems configured for:

generating a difference image for the one or more patterned features by subtracting a reference image from one of the images generated by the detector for the one or more patterned features;

comparing the difference image to different simulated difference images, wherein the different simulated difference images are generated by simulating images generated for the one or more patterned features formed on the specimen with different perturbations, respectively;

based on results of the comparing, assigning an amplitude to each of the different perturbations; and determining one or more boundaries of the one or more patterned features formed on the specimen by applying the different perturbations to one or more designed boundaries of the one or more patterned features with the assigned amplitudes.

2. The system of claim 1, wherein the one or more computer subsystems are further configured for detecting defects on the specimen based on the one or more determined boundaries.

3. The system of claim 1, wherein the one or more computer subsystems are further configured for detecting defects on the specimen based on the one or more determined boundaries and determining one or more sub-resolution features of the defects based on the one or more determined boundaries.

4. The system of claim 1, wherein the one or more computer subsystems are further configured for comparing the one or more determined boundaries and the one or more designed boundaries and determining if one or more differences between the one or more determined boundaries and the one or more designed boundaries are caused by one or more defects of interest, one or more nuisances, or noise.

5. The system of claim 1, wherein the different perturbations comprise deviations in the one or more designed boundaries of the one or more patterned features due to known defects of interest and known nuisances.

6. The system of claim 1, wherein the different perturbations comprise deviations in the one or more designed boundaries of the one or more patterned features at two or more different positions along the one or more boundaries.

7. The system of claim 1, wherein said comparing comprises finding a combination of the smallest number of the different simulated images that generates the closest approximation to the difference image.

8. The system of claim 7, wherein said comparing is performed with regularization to constrain finding a solution for the combination by representing the solution as a linear combination of functions.

9. The system of claim 1, wherein said comparing is performed using Matching Pursuit.

10. The system of claim 1, wherein the one or more computer subsystems are further configured for generating the simulated difference images, and wherein said simulating comprises simulating an image generated by the detector for the one or more patterned features formed on the specimen with one of the different perturbations and subtracting the reference image for the one or more patterned features from the simulated image to thereby generate one of the simulated difference images.

11. The system of claim 1, wherein the one or more patterned features cannot be resolved in the images generated by the detector.

12. The system of claim 1, wherein the one or more computer subsystems are further configured for generating a reconstructed image of the one or more patterned features from the one or more determined boundaries, and wherein a resolution of the reconstructed image is higher than a resolution of the images generated by the detector.

13. The system of claim 1, wherein the specimen comprises a wafer.

14. The system of claim 1, wherein the specimen comprises a reticle.

15. The system of claim 1, wherein the energy directed to the specimen comprises light, and wherein the energy detected from the specimen comprises light.

16. The system of claim 1, wherein the energy directed to the specimen comprises electrons, and wherein the energy detected from the specimen comprises electrons.

17. A non-transitory computer-readable medium, storing program instructions executable on a computer system for performing a computer-implemented method for determining boundaries of one or more patterned features formed on a specimen from an unresolved image of the one or more patterned features on the specimen, wherein the computer-implemented method comprises:

generating a difference image for one or more patterned features formed on a specimen by subtracting a reference image from an image generated by a detector for the one or more patterned features, wherein an inspection subsystem comprises at least an energy source and the detector, wherein the energy source is configured to generate energy that is directed to the specimen, wherein the detector is configured to detect energy from the specimen and to generate images responsive to the detected energy, and wherein the one or more patterned features formed on the specimen are unresolved in the images generated by the detector;

comparing the difference image to different simulated difference images, wherein the different simulated difference images are generated by simulating images generated for the one or more patterned features formed on the specimen with different perturbations, respectively;

based on results of the comparing, assigning an amplitude to each of the different perturbations; and determining one or more boundaries of the one or more patterned features formed on the specimen by applying the different perturbations to one or more designed boundaries of the one or more patterned features with the assigned amplitudes.

18. A computer-implemented method for determining boundaries of one or more patterned features formed on a specimen from an unresolved image of the one or more patterned features on the specimen, comprising:

generating a difference image for one or more patterned features formed on a specimen by subtracting a reference image from an image generated by a detector for the one or more patterned features, wherein an inspection subsystem comprises at least an energy source and the detector, wherein the energy source is configured to generate energy that is directed to the specimen, wherein the detector is configured to detect energy from the specimen and to generate images responsive to the detected energy, and wherein the one or more patterned features formed on the specimen are unresolved in the images generated by the detector;

comparing the difference image to different simulated difference images, wherein the different simulated difference images are generated by simulating images generated for the one or more patterned features formed on the specimen with different perturbations, respectively;

based on results of the comparing, assigning an amplitude to each of the different perturbations; and determining one or more boundaries of the one or more patterned features formed on the specimen by applying the different perturbations to one or more designed boundaries of the one or more patterned features with the assigned amplitudes, wherein said generating, said comparing, said assigning, and said determining are performed by one or more computer subsystems.

* * * * *